(12) United States Patent
Batchelder (10) Patent No.: US 8,155,775 B2
(45) Date of Patent: Apr. 10, 2012

(54) SUPPORT STRUCTURE PACKAGING

(75) Inventor: J. Samuel Batchelder, Somers, NY (US)

(73) Assignee: Stratasys, Inc., Eden Prairie, MN (US)

( * ) Notice: Subject to any disclaimer, the term of this patent is extended or adjusted under 35 U.S.C. 154(b) by 413 days.

(21) Appl. No.: 12/571,798

(22) Filed: Oct. 1, 2009

(65) Prior Publication Data
US 2010/0086721 A1 Apr. 8, 2010

Related U.S. Application Data

(60) Provisional application No. 61/102,076, filed on Oct. 2, 2008.

(51) Int. Cl.
*G06F 19/00* (2011.01)
*B29C 45/76* (2006.01)
*B29C 47/92* (2006.01)
*B28C 1/14* (2006.01)
*B28C 1/00* (2006.01)
*B28C 3/00* (2006.01)
*B28C 5/00* (2006.01)

(52) U.S. Cl. .......... 700/119; 700/95; 700/117; 700/182; 264/40.1; 264/40.7; 264/308; 264/673

(58) Field of Classification Search ............... 700/95, 700/117, 119, 182; 264/40.1, 40.7, 308, 264/673
See application file for complete search history.

(56) References Cited

U.S. PATENT DOCUMENTS

| | | | |
|---|---|---|---|
| 4,397,986 A | 8/1983 | Hornbaker | |
| 4,886,856 A | 12/1989 | Chen et al. | |
| 5,121,329 A | 6/1992 | Crump | |
| 5,303,141 A | 4/1994 | Batchelder et al. | |
| 5,340,433 A | 8/1994 | Crump | |
| 5,402,351 A | 3/1995 | Batchelder et al. | |
| 5,474,719 A | 12/1995 | Fan et al. | |
| 5,503,785 A * | 4/1996 | Crump et al. | 264/40.7 |
| 5,653,925 A | 8/1997 | Batchelder | |
| 5,695,707 A | 12/1997 | Almquist et al. | |
| 5,764,521 A | 6/1998 | Batchelder et al. | |
| 5,866,058 A | 2/1999 | Batchelder et al. | |
| 5,939,008 A | 8/1999 | Comb et al. | |
| 6,022,207 A | 2/2000 | Dahlin et al. | |
| 6,067,480 A | 5/2000 | Stuffle et al. | |
| 6,070,107 A * | 5/2000 | Lombardi et al. | 700/119 |
| 6,129,872 A | 10/2000 | Jang | |
| 6,165,406 A | 12/2000 | Jang et al. | |
| 6,175,422 B1 | 1/2001 | Penn et al. | |
| 6,228,923 B1 | 5/2001 | Lombardi et al. | |
| 6,572,807 B1 | 6/2003 | Fong | |
| 6,645,412 B2 * | 11/2003 | Priedeman, Jr. | 264/219 |
| 6,722,872 B1 | 4/2004 | Swanson et al. | |

(Continued)

FOREIGN PATENT DOCUMENTS

WO 2006022528 A1 3/2006

*Primary Examiner* — Ronald Hartman, Jr.
(74) *Attorney, Agent, or Firm* — Brian R. Morrison; Westman, Champlin & Kelly, P.A.

(57) ABSTRACT

A method comprising building at least one three-dimensional model and a support structure using a layer-based additive technique, where the at least one three-dimensional model is at least partially encased in the support structure, and where the support structure functions as a shipping package for the at least one three-dimensional model.

11 Claims, 7 Drawing Sheets

U.S. PATENT DOCUMENTS

| | | |
|---|---|---|
| 6,790,403 B1 | 9/2004 | Priedeman, Jr. et al. |
| 6,814,907 B1 | 11/2004 | Comb |
| 6,907,307 B2 | 6/2005 | Chen et al. |
| 6,923,634 B2 | 8/2005 | Swanson et al. |
| 7,077,638 B2 | 7/2006 | Leyden et al. |
| 7,236,166 B2 * | 6/2007 | Zinniel et al. .................. 345/419 |
| 8,014,889 B2 * | 9/2011 | Zinniel et al. .................. 700/119 |
| 8,028,501 B2 * | 10/2011 | Buckley et al. .................. 53/456 |
| 8,068,929 B2 * | 11/2011 | Teran-Matus et al. ........ 700/117 |
| 2003/0090752 A1 | 5/2003 | Rosenberger et al. |
| 2004/0222561 A1 | 11/2004 | Hopkins |
| 2005/0004282 A1 | 1/2005 | Priedeman, Jr. et al. |
| 2005/0055181 A1 * | 3/2005 | Verdura et al. .................... 703/1 |
| 2005/0103360 A1 | 5/2005 | Tafoya |
| 2005/0129941 A1 | 6/2005 | Comb et al. |
| 2005/0173838 A1 | 8/2005 | Priedeman, Jr. et al. |
| 2007/0003656 A1 | 1/2007 | LaBossiere et al. |
| 2007/0228590 A1 | 10/2007 | LaBossiere et al. |
| 2008/0213419 A1 | 9/2008 | Skubic et al. |
| 2009/0035405 A1 | 2/2009 | Leavitt |
| 2009/0173443 A1 | 7/2009 | Kozlak et al. |
| 2009/0174709 A1 | 7/2009 | Kozlak et al. |
| 2009/0177309 A1 | 7/2009 | Kozlak |
| 2010/0106277 A1 * | 4/2010 | Barlier et al. .................... 700/98 |

* cited by examiner

SUPPORT STRUCTURE PACKAGING

CROSS-REFERENCE TO RELATED APPLICATION(S)

The present application claims priority to U.S. Provisional Application No. 61/102,076, filed on Oct. 2, 2008, and entitled "SUPPORT STRUCTURE PACKAGING", the disclosure of which is incorporated by reference in its entirety.

BACKGROUND

The present disclosure relates to three-dimensional (3D) models built with digital manufacturing systems using layer-based additive techniques. In particular, the present disclosure relates to the use of support structures for building and transporting 3D models.

Digital manufacturing systems are used to build 3D models from digital representations of the 3D models (e.g., STL format files) using one or more layer-based additive techniques. Examples of commercially available layer-based additive techniques include fused deposition modeling, ink jetting, selective laser sintering, electron-beam melting, and stereolithographic processes. For each of these techniques, the digital representation of the 3D model is initially sliced into multiple horizontal layers. For each sliced layer, a build path is then generated, which provides instructions for the particular digital manufacturing system to form the given layer. For deposition-based systems (e.g., fused deposition modeling and ink jetting), the build path defines the pattern for depositing roads of modeling material from a moveable deposition head to form the given layer. Alternatively, for energy-application systems (e.g., selective laser sintering, electron-beam melting, and stereolithographic processes), the build path defines the pattern for emitting energy from a moveable energy source (e.g., a laser) to form the given layer.

For example, in a fused deposition modeling system, modeling material is extruded from a moveable extrusion head, and is deposited as a sequence of roads on a substrate in an x-y plane based on the build path. The extruded modeling material fuses to previously deposited modeling material, and solidifies upon a drop in temperature. The position of the extrusion head relative to the substrate is then incremented along a z-axis (perpendicular to the x-y plane), and the process is then repeated to form a 3D model resembling the digital representation.

In fabricating 3D models by depositing layers of modeling materials, supporting layers or structures are typically built underneath overhanging regions of 3D models under construction, which are not supported by the modeling material itself. A support structure may be built utilizing the same deposition techniques by which the modeling material is deposited. The host computer generates additional geometry acting as a support structure for the overhanging or free-space segments of the 3D model being formed. The support material adheres to the modeling material during fabrication, and is removable from the completed 3D model when the build process is complete.

In many situations, designers may not have direct access to digital manufacturing systems, or may only require a limited number of 3D models to be manufactured. In these cases, it may be more efficient and cost effective for the designers to have professional manufacturers that are experts with the digital manufacturing systems to perform the work. For example, customers may submit their digital representations to a manufacturer of 3D models, and the manufacturer may build the 3D models using one or more digital manufacturing systems. After the build operations are complete, the manufacturer may then ship the resulting 3D models to the customers. While this provides an efficient and cost effective means for customers to attain built 3D models, many 3D models may be subject to potentially damaging conditions during packaging, storage, and/or shipping. This is particularly true for 3D models that contain fine features. Thus, there is an ongoing need for techniques that increase the safety of 3D models during storage and transit to customers.

SUMMARY

An aspect of the disclosure is directed to a three-dimensional object that includes at least one three-dimensional model and a support structure built using a layer-based additive technique, where the at least one three-dimensional model is at least partially encased in the support structure, and where the support structure functions as a shipping package for the at least one three-dimensional model.

Another aspect of the disclosure is directed to a method of building and using a support structure. The method includes building at least one three-dimensional model and a support structure using a layer-based additive technique such that the built support structure at least partially encases the at least one three-dimensional model. The method further includes shipping the at least one built three-dimensional model while at least partially encased in the built support structure.

A further aspect of the disclosure is directed to a method for providing a three-dimensional model to a customer based on a digital representation of the three-dimensional model. The method includes generating a first digital representation of a support structure based on at least one overhanging region of the digital representation of the three-dimensional model, generating a second digital representation of the support structure based on a predetermined offset value from at least one exterior surface of the digital representation of the three-dimensional model, and generating build data based at least in part on the digital representation of the three-dimensional model, the first digital representation of the support structure, and the second digital representation of the support structure. The method further includes building the three-dimensional model and the support structure with a digital manufacturing system based on the build data such that the built support structure at least partially encases the three-dimensional model, and shipping the built three-dimensional model while at least partially encased in the built support structure.

DETAILED DESCRIPTION

Figure 1:
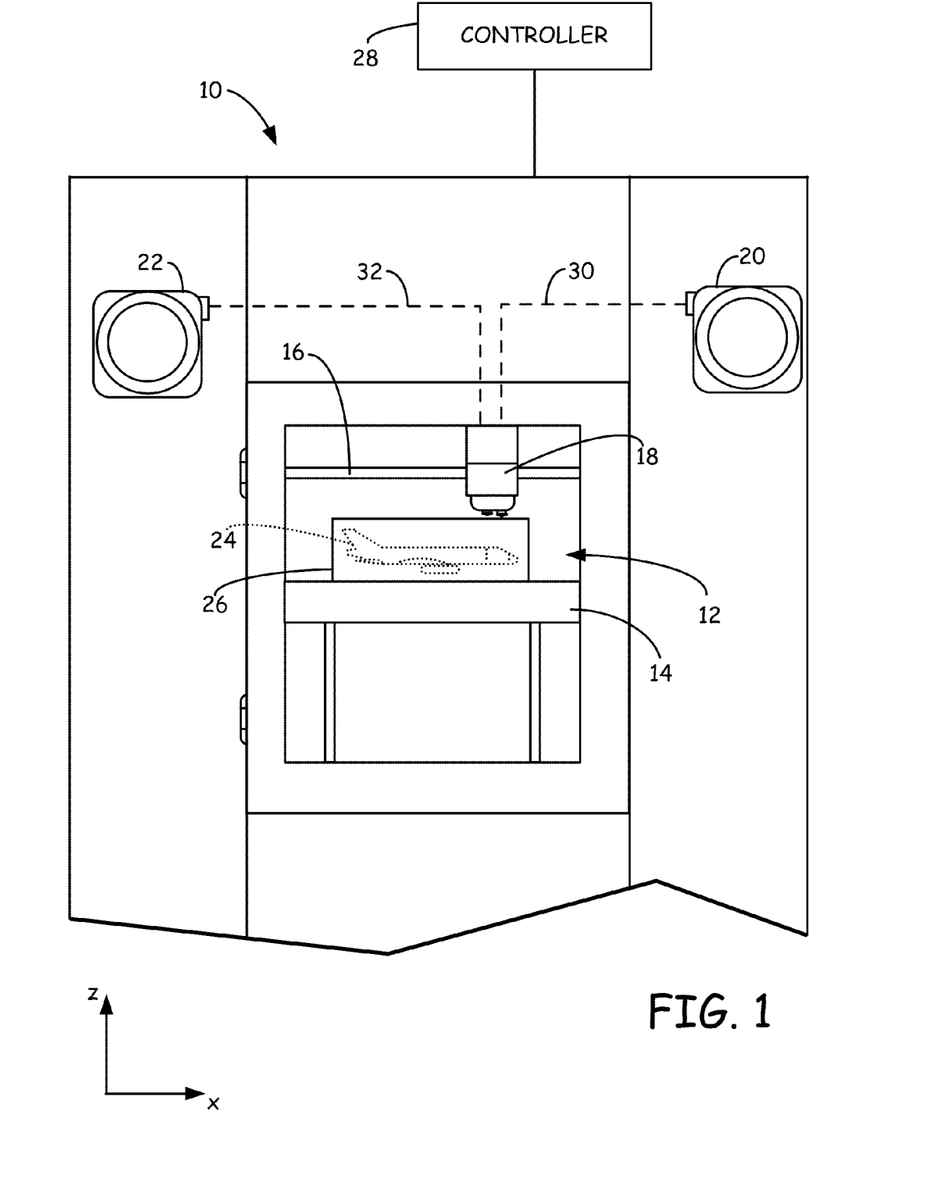
FIG. 1 is a front schematic illustration of a digital manufacturing system for building a 3D model and support structure.

As shown in FIG. 1, system 10 is a digital manufacturing system that includes build chamber 12, platen 14, gantry 16, deposition head 18, and supply sources 20 and 22. System 10 is a deposition-based system, such as an extrusion-based system and/or an ink jetting system, each of which may build 3D models with the use of support structures. Examples of suitable extrusion-based systems for system 10 include fused deposition modeling systems developed by Stratasys, Inc., Eden Prairie, Minn. Build chamber 12 is an enclosed environment that contains platen 14, gantry 16, and deposition head 18 for building a 3D model (referred to as 3D object 24) and a corresponding support structure (referred to as support structure 26). As discussed below, system 10 may build support structure 26 in a manner such that support structure 26 functions as a shipping and storage package for 3D model 24. This is in addition to providing vertical support to overhanging regions of 3D model 24 during a build operation.

Platen 14 is a platform on which 3D model 24 and support structure 26 are built, and desirably moves along a vertical z-axis based on signals provided from computer-operated controller 28. Gantry 16 is a guide rail system that is desirably configured to move deposition head 18 in a horizontal x-y plane within build chamber 12 based on signals provided from controller 28. The horizontal x-y plane is a plane defined by an x-axis and a y-axis (not shown in FIG. 1), where the x-axis, the y-axis, and the z-axis are orthogonal to each other. In an alternative embodiment, platen 14 may be configured to move in the horizontal x-y plane within build chamber 12, and deposition head 18 may be configured to move along the z-axis. Other similar arrangements may also be used such that one or both of platen 14 and deposition head 18 are moveable relative to each other.

Deposition head 18 is supported by gantry 16 for building 3D model 24 and support structure 26 on platen 14 in a layer-by-layer manner, based on signals provided from controller 28. A modeling material is supplied to deposition head 18 from supply source 20 via feed line 30, and a support material is supplied to deposition head 18 from supply source 22 via feed line 32. For extrusion-based systems, suitable assemblies for supply sources 20 and 22 are disclosed in Swanson et al., U.S. Pat. No. 6,923,634 and Comb et al., U.S. Pat. No. 7,122,246. In alternative embodiments, system 10 may include a variety of different configurations for supplying one or more modeling materials and one or more support materials. Furthermore, system 10 may include a plurality of deposition heads 18 for depositing modeling and/or support materials.

The modeling material may include any suitable material for building 3D models with system 10. For extrusion-based systems, examples of suitable modeling materials for use with system 10 include thermoplastic materials, such as acrylonitrile-butadiene-styrene (ABS) copolymers, polycarbonates, polyphenylsulfones, modified variations thereof (e.g., ABS-M30 copolymers), and blends thereof. Correspondingly, for extrusion-based systems, examples of suitable materials for use with system 10 include thermoplastic, water-soluble, support materials commercially available under the trade designations "WATERWORKS" and "SOLUBLE SUPPORTS" from Stratasys, Inc., Eden Prairie, Minn.; and break-away support materials commercially available under the trade designation "BASS" from Stratasys, Inc., Eden Prairie, Minn., and those disclosed in Crump et al., U.S. Pat. No. 5,503,785; Lombardi et al., U.S. Pat. Nos. 6,070,107 and 6,228,923; and Priedeman et al., U.S. Pat. No. 6,790,403. Examples of particularly suitable support materials for use with system 10 include thermoplastic, water-soluble, support materials. For ink jetting-based systems, examples of suitable modeling materials for use with system 10 include any ink jettable modeling material, such as photopolymerizable jetting materials. Correspondingly, for ink jetting-based systems, examples of suitable support materials for use with system 10 include any ink jettable support material, such as photopolymerizable, water-soluble, jetting materials.

During a build operation, gantry 16 moves extrusion head 18 around in the horizontal x-y plane within build chamber 12, and one or more feed mechanisms (not shown) are directed to intermittently feed the modeling and support materials through deposition head 18 from supply sources 20 and 22. The received modeling and support materials are then deposited onto platen 14 to build 3D model 24 and support structure 26 using a layer-based additive technique. Support structure 22 is desirably deposited to provide vertical support along the z-axis for overhanging regions of the layers of 3D model 24. This allows 3D object 24 to be built with a variety of geometries. In addition to providing vertical support, support structure 26 is also desirably deposited to function as a package for shipping and/or storing 3D model 24. As discussed below, this protects 3D model 24 during transit and storage, and reduces material expenses for shipping 3D model 24 (e.g., packaging costs).

Upon receipt, the customer may remove support structure 26 from 3D model 24, thereby obtaining the desired 3D model 24. Suitable techniques for removing support structure 26 from 3D model 24 may vary depending on the support material used. In embodiments in which the support material of support structure 26 is a water-soluble support material, the customer may remove support structure 26 from 3D model 24 by exposing the combined 3D model 24/support structure 26 to an aqueous solution (e.g., an alkaline aqueous solution), as disclosed in Lombardi et al., U.S. Pat. Nos. 6,070,107 and 6,228,923; and Priedeman et al., U.S. Pat. No. 6,790,403. Alternatively, in embodiments in which the support material of support structure 26 is a break-away support material, the customer may remove support structure 26 from 3D model 24 by physically breaking support structure 26 away from 3D model 24 (e.g., under an elevated temperature), as disclosed in Crump et al., U.S. Pat. No. 5,503,785. The resulting 3D model 24 is then available as if removed from support structure 26 by the manufacturer and shipped in a conventional manner.

Figure 2:
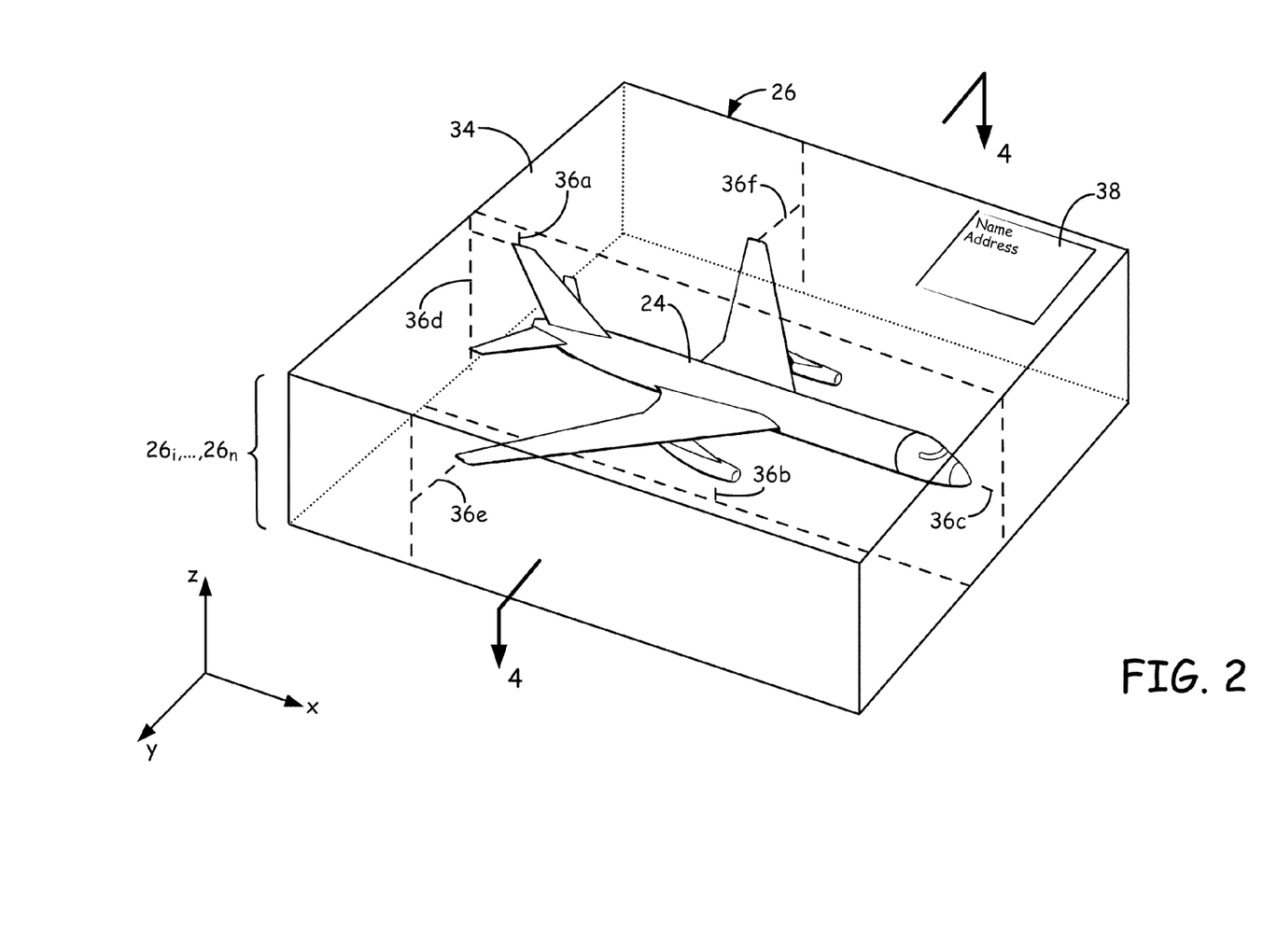
FIG. 2 is a perspective view of a 3D model encased in a support structure package.

As shown in FIG. 2, after the build operation is complete, 3D model 24 is desirably at least partially encased within support structure 26. Thus, the support material layers of support structure 26 (i.e., layers $26_i$, $26_{i+1}$, ..., $26_n$) are at least partially bonded to the modeling material layers of 3D model 24, and support structure 26 functions as a shipping package for 3D model 24. In the shown embodiment, support structure 26 exhibits a cubic block geometry that entirely encases 3D model 24 within support structure 26. This embodiment is beneficial for providing a support structure package having dimensions that are suitable for protecting 3D model 24 during storage and transit.

As further shown in FIG. 2, support structure 26 includes exterior surface 34, which is offset from the extremities of 3D model 24 by offset distances 36a-36f. Accordingly, exterior surface 34 of support structure 26 is desirably built to be offset from one or more of the extremities of 3D model 24 by at least an "offset distance", which may be predetermined to provide sufficient protection to the 3D model 24 during storage and transit. The offset distance may vary depending on a variety of factors, such as the dimensions of the features of 3D model 24, the strengths of the modeling and support materials, the density of support structure 26, and combinations thereof. Furthermore, the offset distances may differ between extremities of 3D model 24. For example, one or more of offset distances 36a-36f may be different from each other.

In addition to providing a sufficient perimeter thickness around 3D model 24, support structure also reduces vibrational damage that may occur during storage or transit. As discussed above, during the build operation, the layers of support structure 26 are at least partially bonded to the layers of 3D model 24, thereby allowing subsequent layers to be deposited on the previously deposited layers. This interlayer bonding reduces the risk of 3D model 24 moving around within support structure 26, thereby reducing vibrational damage. This is particularly suitable in embodiments in which support structure 26 is built from a water-soluble support material that exhibits a good interlayer bond with the layers of 3D model 24.

The cubic geometry of support structure 26 is also beneficial because it may be shaped to conform to standard package shipping sizes, thereby avoiding shipping costs that may otherwise incur with off-shaped packages. The cubic geometry also provides planar surfaces for retaining one or more labels, such as shipping label 38. Shipping label 38 may include a variety of information for shipping 3D model 24 and support structure 26 to an intended customer, such as the recipient's name and address, the order number, one or more scanning bar codes, the sender's return address, and the like. Shipping label 38 is desirably formed on or in exterior surface 34 of support structure 26 during the build operation, thereby reducing costs of additional printed labels. For example, the indicia of shipping label 38 may formed from a support material having a different color from the bulk support material of exterior surface 34, and/or may exhibit topography relative to exterior surface 34. In alternative embodiments, shipping label 38 may be a standard shipping label that is written or adhesively applied to one or more portions of exterior surface 34.

In an additional embodiment, 3D model 24 and/or support structure 26 may include one or more embedded identification tags (not shown), such as a radio-frequency (RF) identification tag. This allows RF receivers to track the location and transit route of 3D model 24 and support structure 26. This embodiment is particularly suitable for route tracking identification tags embedded within support structure 26, which is retained with 3D model 24 during storage and transit to a customer. During transit, the embedded identification tag may be used to track the route and progress of the shipped 3D model 24/support structure 26. Upon receipt, the customer may remove support structure 26 from model 24, as discussed above, thereby also removing the identification tag with support structure 26. Examples of suitable identification tags, and suitable systems and techniques for embedding identification tags into 3D models and support structures are disclosed in U.S. patent application Ser. No. 12/006,956, entitled "Method for Building and Using Three-Dimensional Objects Containing Embedded Identification-Tag Inserts"; U.S. patent application Ser. No. 12/006,947, entitled "System For Building Three-Dimensional Objects Containing Embedded Inserts, And Methods Of Use Thereof; and U.S. patent application Ser. No. 12/006,955, entitled "Method for Building Three-Dimensional Objects Containing Embedded Inserts".

While support structure 26 is illustrated as having a cubic geometry, support structure 26 may alternatively be built with a variety of different geometries. For example, support structure 26 may be generated and built such that exterior surface 34 extends around each portion of 3D model 24 by the offset distance. In this embodiment, support structure 26 exhibits dimensions that provide sufficient vertical support to overhanging regions of 3D model 24, and that generally conform to the dimensions of 3D model 24. This is beneficial for reducing the amount of support material required to build support structure 26, thereby also reducing the time required to build support structure 26 using the layer-based additive technique with system 10.

Furthermore, while 3D model 24 is illustrated as being completely encased within support structure 26, in alternative embodiments, one or more portions of 3D model 24 may be exposed outside of support structure 26. This embodiment may be used to protect fine features of 3D object 24 during storage or transit, while reducing the amount of support material required to build support structure 26. Thus, in the various embodiments of the present disclosure, the support structures (e.g., support structure 26) may be generated and built to at least partially encase the 3D models (e.g., 3D model 24) during the build operation, and more desirably, the support structures may be generated and built to completely encase the 3D models.

Figure 3:
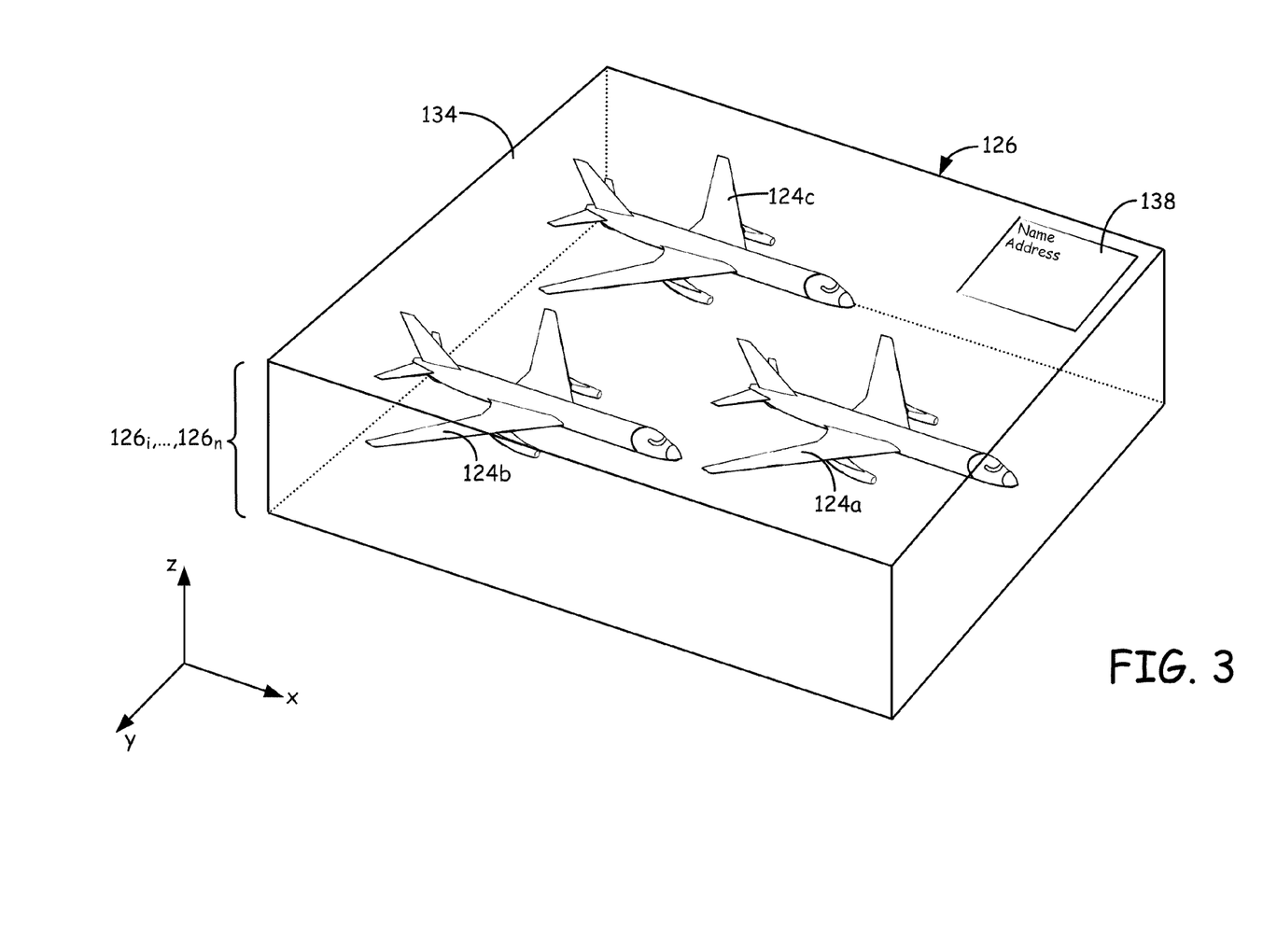
FIG. 3 is a perspective view of multiple 3D models encased in a support structure package.

FIG. 3 is a perspective view of 3D models 124a-124c encased within support structure 126, and is an alternative embodiment to 3D model 24 and support structure 26 shown in FIG. 2, and where the respective reference labels are increased by "100". As shown in FIG. 3, a single support structure (e.g., support structure 126) may be generated and built to at least partially (or fully) encase a plurality of 3D models (e.g., 3D models 124a-124c). This is beneficial for building multiple 3D models with a single support structure in a single build operation, and also allows the single support structure to function as a shipping package for the multiple 3D models. The various embodiments discussed above for 3D model 24 and support structure 26 are also applicable to this embodiment with multiple 3D models.

Furthermore, the digital representations of one or more of the 3D models (e.g., 3d models 124a-124c) may be reoriented to optimize the build envelope within build chamber 12. For example, the digital representations may be reoriented to minimize the footprint required for the multiple 3D models, thereby reducing the amount of support material required for supporting overhanging regions of the 3D models and for functioning as a shipping package. Suitable techniques for reorienting the 3D models is disclosed in Heide et al., U.S. Pat. No. 7,403,833. This embodiment is beneficial for use with 3D models having different geometries, and increases the versatility of using support structures as support and shipping packages for 3D models.

Figure 4:
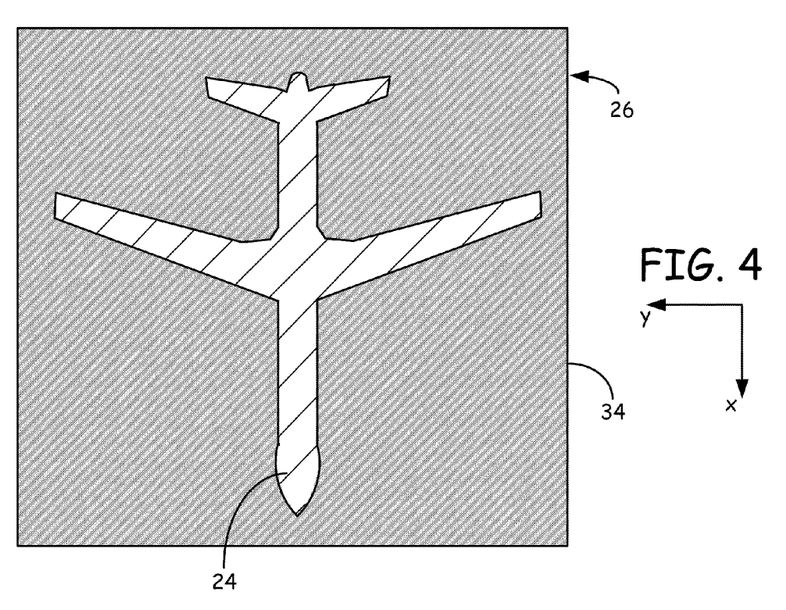
FIG. 4 is a sectional view of section 4-4 taken in FIG. 2, illustrating a support structure built with a single build style.
Figure 5:
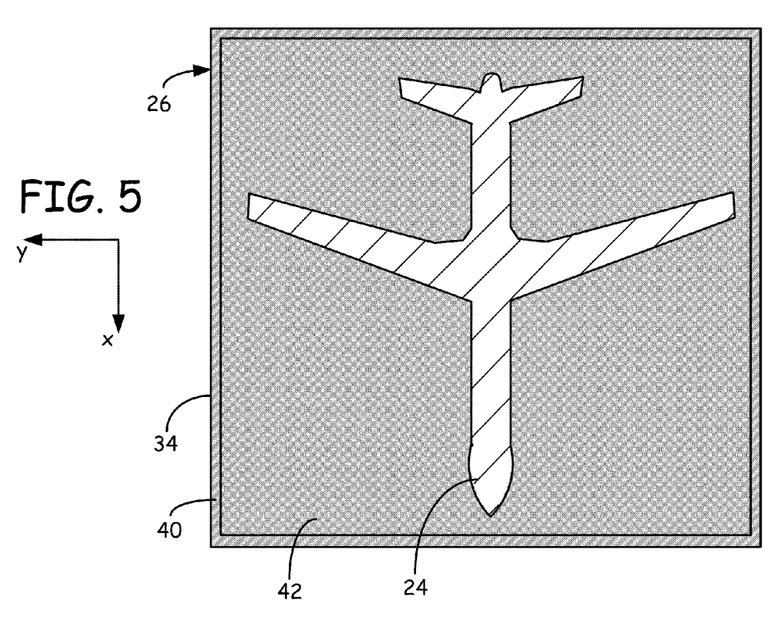
FIG. 5 is a first alternative sectional view of section 4-4 taken in FIG. 2, illustrating a support structure built with multiple build styles.

FIGS. 4-9 are alternative sectional views of section 4 taken in FIG. 2, illustrating a variety of different build styles that may be used to build the of the present disclosure (e.g., support structures 26 and 126), where the various build styles may also be used in variety of different combinations. As shown in FIG. 4, support structure 26 may be entirely built with a single build style. For example, support structure 26 may be built with densely packed roads of the support material, thereby provide a strong package that also provides a moisture seal. Alternatively, as shown in FIG. 5, support structure 26 may include multiple build styles, such as skin portion 40 and bulk volume 42. In this embodiment, skin portion 10 may be built with densely packed roads of the support material, and bulk volume 42 may be built with sparsely filled roads of the support material. Skin portion 26 is suitable for providing a moisture seal and structural integrity, while the sparsely filled arrangement of bulk volume 42 is suitable for cushioning 3D model 24 during storage and transit. The sparsely filled arrangement of bulk volume 42 also reduces the amount of support material required to build support structure 26, thereby further reducing build times and material costs, and reducing the overall weight of support structure 26.

Figure 6:
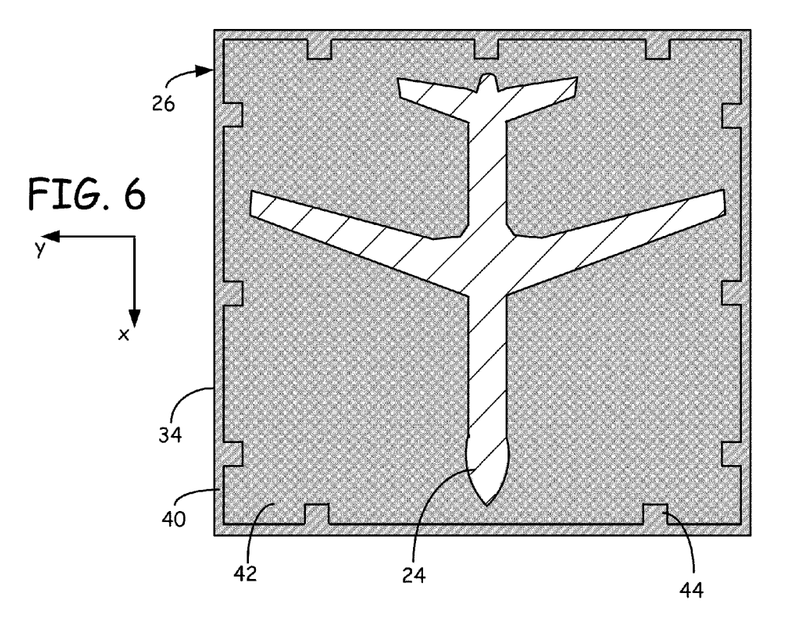
FIG. 6 is a second alternative sectional view of section 4-4 taken in FIG. 2, illustrating a support structure built with multiple build styles that include reinforcing ribs.

As shown in FIG. 6, support structure 26 may include skin portion 40 and bulk volume 42, and may further include reinforcing ribs 44, which may be built with densely packed roads of the support material. As such, reinforcing ribs 44 are suitable for transferring loads applied to support structure 26, such as when additional packages are placed on top of support structure 26. In alternative embodiments, support structure 26 may include a variety of different number and designs for the reinforcing ribs, such that support structure 26 includes at least one reinforcing rib. Furthermore, the reinforcing ribs may extend along any coordinate axis (e.g., any horizontal, vertical, and/or angled axis), which may vary depending on the dimensions of support structure 26.

Figure 7:
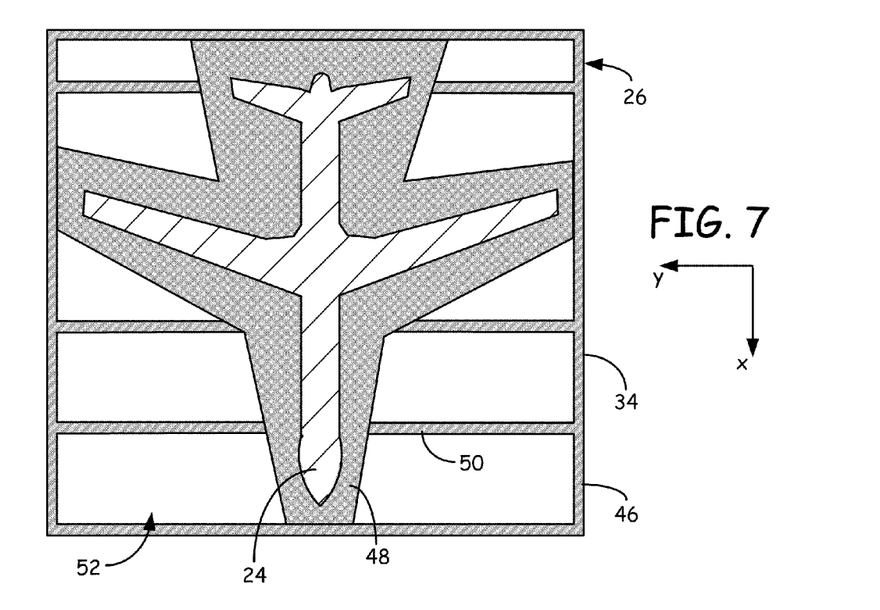
FIG. 7 is a third alternative sectional view of section 4-4 taken in FIG. 2, illustrating a support structure built with multiple build styles that include hollow regions and reinforcing struts.

As shown in FIG. 7, support structure 26 may include skin portion 46, interior portion 48, and reinforcing struts 50, where skin portion 46 and interior portion 48 may be built in the same manner as discussed above for skin portion 40 (e.g., densely filled roads) and bulk portion 42 (e.g., sparsely filled roads). This arrangement of support structure 26 defines hollow region 52 between skin portion 46 and interior portion 48, where reinforcing struts 50 desirably extend through hollow region 52. Hollow region 52 is desirably defined by regions of support structure 26 that do not require vertical support, such as overhanging regions extending at angles of about 45 degrees or less from a vertical axis (i.e., the z-axis).

Reinforcing struts 50 may also be built with densely packed roads of the support material. This allows reinforcing struts 50 to reinforce skin portion 46 relative to interior portion 48, thereby providing additional cushioning for 3D model 24 during storage and transit. The use of reinforcing struts 50 and hollow region 52 further reduces the amount of support material required to build support structure 26, thereby further reducing build times and material costs, and reducing the overall weight of support structure 26. In alternative embodiments, support structure 26 may include a variety of different number and designs for the reinforcing struts, such that support structure 26 includes at least one reinforcing strut. Furthermore, the reinforcing struts may also extend along any coordinate axis (e.g., any horizontal, vertical, and/or angled axis), which may vary depending on the dimensions of support structure 26.

Figure 8:
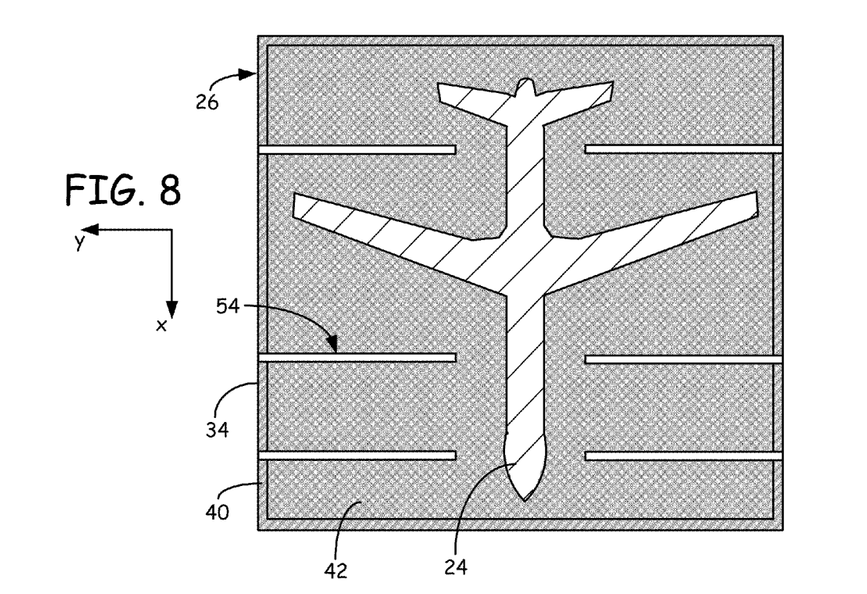
FIG. 8 is a fourth alternative sectional view of section 4-4 taken in FIG. 2, illustrating a support structure built with multiple build styles that include fluid channels.

As shown in FIG. 8, support structure 26 may include skin portion 40 and bulk volume 42, which may define fluid channels 54. Fluid channels 54 are hollow channels extending through support structure 26 that provide access to interior regions of support structure 26. Fluid channels 54 are also desirably defined by regions of support structure 26 that do not require vertical support, such as overhanging regions extending at angles of about 45 degrees or less from a vertical axis (i.e., the z-axis). Alternatively, fluid channels 54 may be defined as one or more vertical channels within support structure 26.

This embodiment is beneficial for use with water-soluble support materials, where fluid channels 54 allows the aqueous solutions to readily reach the interior regions of support structure 26. This accordingly increases surface area over which the aqueous solutions may contact support structure 26, which increases the rate at which support structure 26 may be removed from 3D model 24. In alternative embodiments, support structure 26 may include a variety of different number and designs for the fluid channels, such that support structure 26 includes at least one fluid channel. Furthermore, the fluid channels may also extend along any coordinate axis (e.g., any horizontal, vertical, and/or angled axis), which may vary depending on the dimensions of support structure 26.

Figure 9:
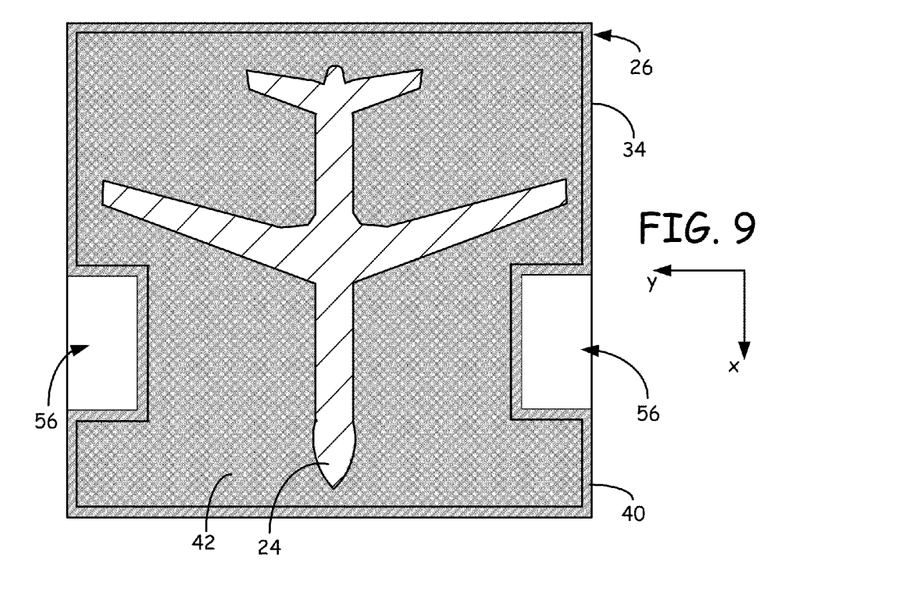
FIG. 9 is a fifth alternative sectional view of section 4-4 taken in FIG. 2, illustrating a support structure built with multiple build styles that include package handles.

As shown in FIG. 9, support structure 26 may include skin portion 40 and bulk volume 42, which may also define handles 56. Handles 56 are desirably indentations in exterior surface 34 that allow a user to attain a suitable grip on support structure 26. Handles 56 is also desirably defined by regions of support structure 26 that do not require vertical support, such as overhanging regions extending at angles of about 45 degrees or less from a vertical axis (i.e., the z-axis). Alternatively, handles 56 may be defined as one or more vertical indentations within support structure 26. In additional alternative embodiments, support structure 26 may include a variety of different number and designs for handles, such that support structure 26 includes at least one handle. Furthermore, the handles may also extend along any coordinate axis (e.g., any horizontal, vertical, and/or angled axis), which may vary depending on the dimensions of support structure 26. Accordingly, the above-discussed features of support structure 26 illustrate a variety of different features that may be incorporated into support structures of the present disclosure (e.g., support structures 26 and 126) with the use of different build styles for building support structure 26.

Figure 10:
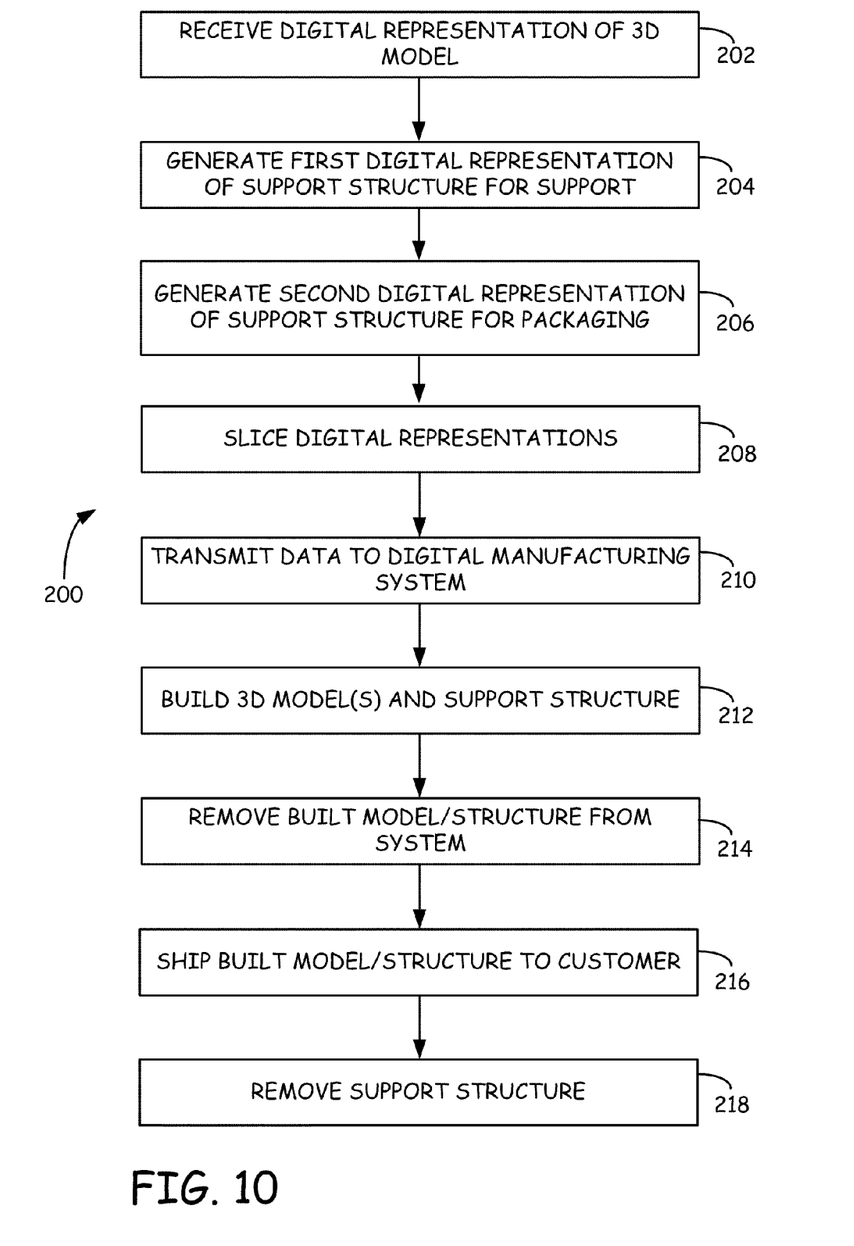
FIG. 10 is a flow diagram of a method for building and using a support structure package.

FIG. 10 is a flow diagram of method 200 for building and using a support structure to support and ship a 3D model. The following discussion of method 200 is made with reference to a single 3D model and a single support structure with the understanding that method 200 may also suitable for use with a plurality of 3D models and a plurality of support structures in the same manner. Method 200 includes steps 202-218, and initially involves receiving a digital representation of a 3D model (step 202). For example, a customer may submit the digital representation to a manufacturer that operates one or more digital manufacturing systems. The manufacturer may receive the digital representation from a variety of media, such as over an Internet network or on a physical data storage medium. Upon receipt, the digital representation may be stored on one or more non-volatile media, and the computer-based system may initially clean up and reorient the digital representations to desirably optimize one or more build properties (e.g., reduce the amount of required support material).

The computer-based system may generate a digital representation of a support structure for providing vertical support to overhanging regions of the 3D model and for functioning as a shipping package (steps 204 and 206). For example, as discussed above, a digital representation of a single support structure may be generated for a single 3D model (e.g., as shown in FIG. 2). Alternatively, a digital representation of a single support structure may be generated for multiple 3D models (e.g., as shown in FIG. 3), thereby allowing the single support structures to function as a shipping package for all of the 3D models. In a further alternative embodiment, digital representations of multiple support structures may be generated, thereby allowing each of the multiple support structures to function as a shipping package for one or more of the 3D models. The determination of the number of support structures to build may vary depending on a variety of factors, such as shipping costs, the amount of support material required, the sizes of the 3D models, the final orientations of the digital representations of the 3D models, and the like.

In one embodiment, pursuant to step 204, the computer-based system may generate a first digital representation of the support structure to provide vertical support for one or more overhanging regions of the 3D model. Pursuant to step 206, the computer-based system may also generate a second digital representation of the support structure to function as shipping package. For example, the second digital representation may extend around the exterior surface of the 3D model in each coordinate direction by at least the offset distance, thereby providing physical protection to the 3D model during storage and transit. Thus, in addition to being located vertically below overhanging regions of the 3D model, the resulting support structure may also be located adjacent to the lateral walls and top surfaces of the 3D model. The second digital representation may also include additional build features, such as dimensions for building shipping labels 38 and 138.

The first and second digital representation(s) generated pursuant to steps 204 and 206 may be generated in either order or simultaneously. For example, a support structure algorithm stored on one or more non-volatile media of the computer-based system may be modified to generate additional support structure regions to function as a shipping package. The resulting generated first and second digital representations, along with the digital representation of the 3D model may be stored on one or more non-volatile media, and/or temporarily stored on volatile media. Examples of suitable non-volatile media include a variety of different data storage devices, such as hard disk drives, flash-based drives, optical storage discs, and the like. Examples of suitable volatile media include computer-based random access memory devices, and the like.

The digital representation of the 3D model and the support structure may then be sliced into a plurality of layers using a slicing algorithm (step 208), and deposition paths may be generated for each sliced layer. The sliced layers and the generated deposition paths may also be stored on one or more non-volatile media, and/or temporarily stored on volatile media. The resulting build data may then be transmitted to one or more digital manufacturing systems (step 210). The digital manufacturing system may then build the 3D model and corresponding support structure using one or more layer-based additive techniques, based on the received build data (step 212). As discussed above, the built 3D model is at least partially encased within the built support structure, and is more desirably fully encased within the built support structure.

The resulting built 3D model/support structure may then be removed from the digital manufacturing system (step 214), and may undergo one or more post-processing steps (e.g., cooling to room temperature). The resulting built 3D model/support structure is then shipped to the customer (step 216), which may be the same entity as the person(s) who sent the digital representation of the 3D model or a different receiving entity based on the shipping information. Upon receipt, the customer may then remove the support structure from the 3D model using a suitable removal technique, as discussed above. The use of the support structure as a shipping package protects the 3D model during storage and transit, and reduces material expenses for shipping the 3D model. Furthermore, after the support structure is removed, the resulting 3D model is then available as if removed from the support structure by the manufacturer and shipped in a conventional manner.

Although the present disclosure has been described with reference to preferred embodiments, workers skilled in the art will recognize that changes may be made in form and detail without departing from the spirit and scope of the disclosure.

The invention claimed is:

1. A method of building and using a support structure, the method comprising:
   receiving a digital representation of a three-dimensional model;
   generating a first digital representation of the support structure based on at least one overhanging region of the digital representation of the at least one three-dimensional model; and
   generating a second digital representation of the support structure based at least in part on dimensions of the digital representation of the at least one three-dimensional model;
   building the three-dimensional model using a layer-based additive technique;
   building the support structure using the layer-based additive technique such that the built support structure at least partially encases the at least one three-dimensional model; and
   shipping the at least one built three-dimensional model while at least partially encased in the built support structure.

2. The method of claim 1, wherein the support structure is built such that the built support structure fully encases the at least one built three-dimensional model.

3. The method of claim 1, wherein the second digital representation of the support structure is generated based at least in part on a predetermined offset distance from at least one exterior surface of the digital representation of the at least one three-dimensional model.

4. The method of claim 1, and further comprising building a shipping label on an exterior surface of the support structure using the layer-based additive technique.

5. The method of claim 1, and further comprising removing the support structure from the at least one three-dimensional model after the shipping.

6. A method of building and using a support structure, the method comprising:
   generating a first digital representation of the support structure based on at least one overhanging region of a digital representation of a three-dimensional model;
   generating a second digital representation of the support structure based on dimensions of the digital representation of the three-dimensional model;
   generating build data based at least in part on the digital representation of the three-dimensional model, the first digital representation of the support structure, and the second digital representation of the support structure;
   building the three-dimensional model and the support structure with a digital manufacturing system using a layer-based additive technique based on the build data such that the built support structure at least partially encases the three-dimensional model; and
   shipping the built three-dimensional model while at least partially encased in the built support structure.

7. The method of claim 6, wherein the support structure is built such that the built support structure fully encases the built three-dimensional model.

8. The method of claim 6, and further comprising receiving the digital representation of the three-dimensional model.

9. The method of claim 6, and further comprising:
   receiving shipping information from the customer;
   generating a digital representation of a shipping label, wherein the generated build data is further based on the digital representation of the shipping label; and building the shipping label on the support structure with the digital manufacturing system based on the build data.

10. The method of claim 6, wherein the digital manufacturing system comprises a deposition-based digital manufacturing system selected from the group consisting on an extrusion-based system, an ink jetting system, and combinations thereof.

11. The method of claim 6, wherein the support structure is built from a support material selected from the group consisting of a water-soluble support material, a break-away support material, and combinations thereof.

* * * * *